Oct. 10, 1961  R. E. RICHARDSON  3,003,286
GLASS BENDING MOULD

Filed Oct. 18, 1956  4 Sheets-Sheet 1

Inventor
Ronald E. Richardson
By Cushman, Darby & Cushman
Attorneys

Oct. 10, 1961    R. E. RICHARDSON    3,003,286
GLASS BENDING MOULD
Filed Oct. 18, 1956    4 Sheets-Sheet 3

Inventor
Ronald E. Richardson
By Cushman, Darby + Cushman
Attorneys

Oct. 10, 1961  R. E. RICHARDSON  3,003,286
GLASS BENDING MOULD
Filed Oct. 18, 1956  4 Sheets-Sheet 4
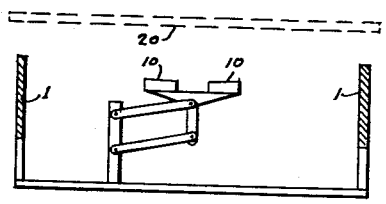
Fig.7.
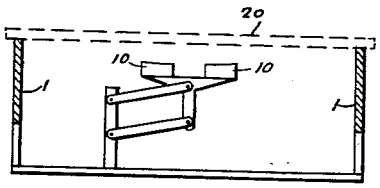
Fig.8.
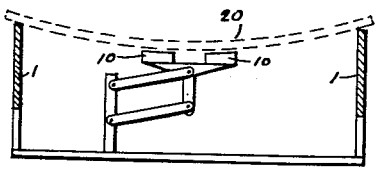
Fig.9.
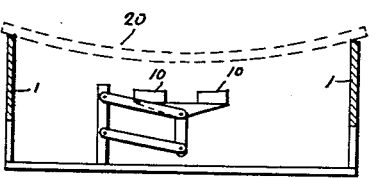
Fig.10.
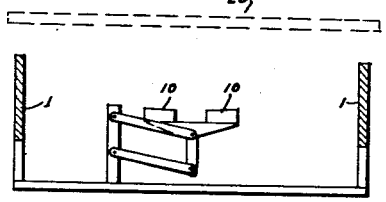
Fig.11.
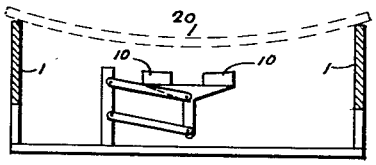
Fig.12.
Fig.13.
Inventor
Ronald E. Richardson
By Cushman, Darby & Cushman
Attorneys

United States Patent Office 3,003,286
Patented Oct. 10, 1961

3,003,286
GLASS BENDING MOULD
Ronald E. Richardson, Oshawa, Ontario, Canada, assignor to Pittsburgh Plate Glass Company, Pittsburgh, Pa.
Filed Oct. 18, 1956, Ser. No. 616,853
Claims priority, application Canada June 28, 1956
9 Claims. (Cl. 49—67)

This invention relates to improvements in the art of glass bending and in the construction of skeleton moulds such as are employed in the bending of elongated glass sheets to curved form. The advent of the wrap-around windshield and rear windows in automobile design has given rise to many difficulties in the construction of moulds for the initial bending of the glass sheets that will ultimately form safety glass wrap-around windshields and rear windows.

The technique employed in forming such wrap-around windshields is now well developed and consists of laying a pair of flat elongated glass sheets on a multi-part skeleton mould which is so formed as to tend to take up its final configuration when so permitted by the softening of the glass. The mould with the glass sheets laid thereon is passed through a lehr whereby the glass is raised to a temperature sufficient to render it yieldable to the forces exerted upon it by the mould. In this manner the required shape is imparted to the glass. Subsequently the two sheets are annealed, an intermediate lamination of a synthetic resinous material is placed between them and they pass to the rolling and pressure treatments before emerging as a finished product. A similar bending operation is employed as a preliminary step in the manufacture of the tempered type of non-laminated safety glass except that each sheet is usually bent individually.

The present invention is concerned with the construction and use of skeleton moulds for the preliminary bending of one or more such sheets during passage through a lehr.

It has become the practice to form skeleton moulds for this purpose with pivoted end portions each of which either can be swung into a "flat" orientation when the flat, cold glass is originally placed in position, or can move into a "curved" orientation as the resistance to bending of the glass decreases on exposure to higher temperatures. Weights are normally provided to urge the movable portions of the mould into such latter orientation. Such moulds may be of the concave or convex type depending on whether the glass is cradled within a concavely curved mould or wrapped around a convexly curved one. The present tendency in the industry is to favour the use of concave moulds, and it is with such moulds that the present invention is principally concerned.

During passage through a lehr of a concave mould bearing one or more sheets of glass, the glass softens sufficiently to allow the mould to take up its curved orientation while the edges of the glass sag down into continuous contact with the side bars of the mould. It is in this manner that the required longitudinal curvature is imparted to the glass.

In the past the design of automobile windshields and rear windows has called only for longitudinal bending of the glass, there having been no significant transverse curvature of the glass in the direction extending from the top to the bottom as mounted in the automobile. No special difficulty has arisen in determining the correct amount of heat to apply to the glass as it travels through the lehr in order readily to permit the longitudinal bending action to take place while ensuring that there is no appreciable sag of the glass in the transverse direction. It will be appreciated that the transverse dimension of the mould is much less than its longitudinal dimension and that therefore a higher temperature than that required for the longitudinal bending would be necessary to cause or permit transverse sagging.

The design of automobile windshields and rear windows has now advanced to the stage where transverse curvature is specifically called for in addition to the longitudinal curvature. To form elongated glass sheets with such compound bends it is desirable to provide additional heat to produce local high temperature areas in the glass, and methods have been developed to accomplish this object. In particular it has been proposed to mount heaters directly on the mould to travel along the lehr with the mould, whereas in the past the heaters have all been fixed to the walls and ceiling of the lehr. By mounting a heater on the mould the source of heat can be brought much closer to the glass but this has been found to lead to difficulty in controlling the amount of transverse sag and ensuring that the final dimensions of the windshield fall within the relatively close tolerances set by the automobile manufacturer. In order to avoid the mould having to be an undue length of time in the lehr, it is desirable to apply the additional local heating comparatively rapidly so that transverse sagging commences quickly and then to arrest such transverse sagging motion sharply once the necessary degree of bending has taken place. This requires comparatively rapid cooling of the glass at a closely controlled point in the operation, i.e. at the time, or just shortly before the time, that the glass has sagged down to the extent necessary to provide the desired transverse curvature.

It is the principal object of the present invention to provide means facilitating control of the degree of a transverse sag given to an elongated sheet of glass by a skeleton type mould.

In its structural aspect the invention consists of the provision, in a skeleton type glass bending mould adapted to support a sheet of glass generally horizontally on a pair of side bars, of a body of metal of thermal capacity large in relation to adjacent mould parts, said body being disposed between said side bars a short distance below the level of a straight line joining the neighbouring upper edges of said bars. Preferably such body of metal is movable between a raised and a lowered position, the raised position being a short distance below said level and the lowered position being a significantly greater distance below such level. In addition, control means will then be provided connected to said mounting means for moving said body to and from the raised and lowered positions.

Methodwise, the invention may be defined as the step of inhibiting transverse bending of a central portion of a glass sheet mounted on a skeleton type glass bending mould and subjected to an elevated temperature, by positioning beneath said portion and in proximity thereto a body of metal of thermal capacity large in relation to adjacent mould parts.

The central area and one end of a concave skeleton mould embodying the present invention is illustrated by way of example in the accompanying drawings. The other end of the mould is assumed to be identical in mirror image with the illustrated end and has thus not been fully shown.

FIGURE 4 is a side view similar to FIGURE 2 but showing the position of the parts assumed after bending of the glass;

FIGURE 6 is a fragment of the mould, seen from the right in FIGURES 1, 2 and 4; while FIGURES 7 to 13 illustrate purely diagrammatically two possible series of operating stages which the mould parts may be made to follow, each of these figures being a simplified sectional view similar to FIGURES 3 or 5.

Figure 1:
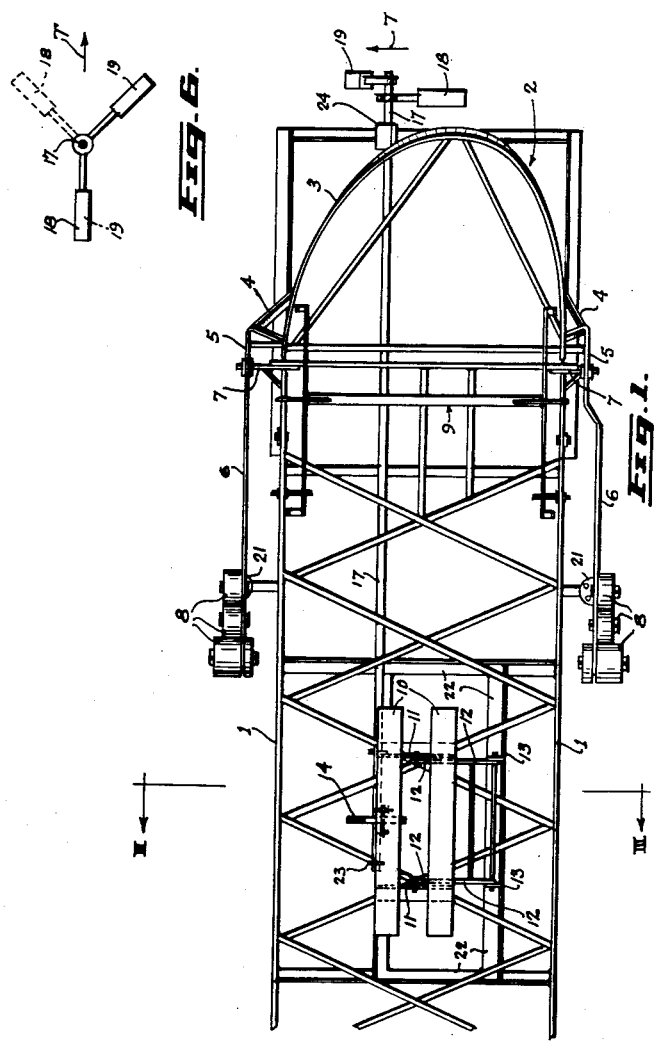
FIGURE 1 shows a plan view of the mould in the initial "flat" position of the parts prior to bending of the glass.

The principal parts of the mould are a pair of side bars 1 that define the perimeter of the main portion of the mould, and a pair of movable end portions 2 (only one visible) mounted each at one end of the mould. Each such movable end portion 2 consists of a curved bar 3 which, in the curved orientation of the mould (FIG. 4), forms a contiguous smooth continuation of the main side bars 1. Each end of the bar 3 adjacent an end of a main side bar 1 is secured by suitable struts 4 to an arched bracket 5 to which there is further secured an arm 6 bearing weights 8. As appears from FIGURE 2, when the parts are in the "flat" position of FIGURES 1 and 2, the arms 6 extend upwardly at an angle approximately equal to that through which it is desired to rotate the end portion 2. The arched brackets 5 which connect the arms 6 to the end portion 2 serve to mount such end portion pivotally on a pair of vertical plates 7, each plate 7 being secured to an end of one of the main side bars 1. To commence a bending operation one or more sheets of glass 20 are laid on the mould in the manner illustrated in FIGURE 2. This glass is supported by the end tips of each of the movable end portions 2, and intermediate to these tips by a pair of "teeter" devices 9 that serve to provide intermediate support for the glass. As appears from FIGURES 2 and 3 the glass at this time is an appreciable distance above the top edges of the side bars 1 in the area adjacent the central portion of the mould considered in the longitudinal direction.

Figure 2:
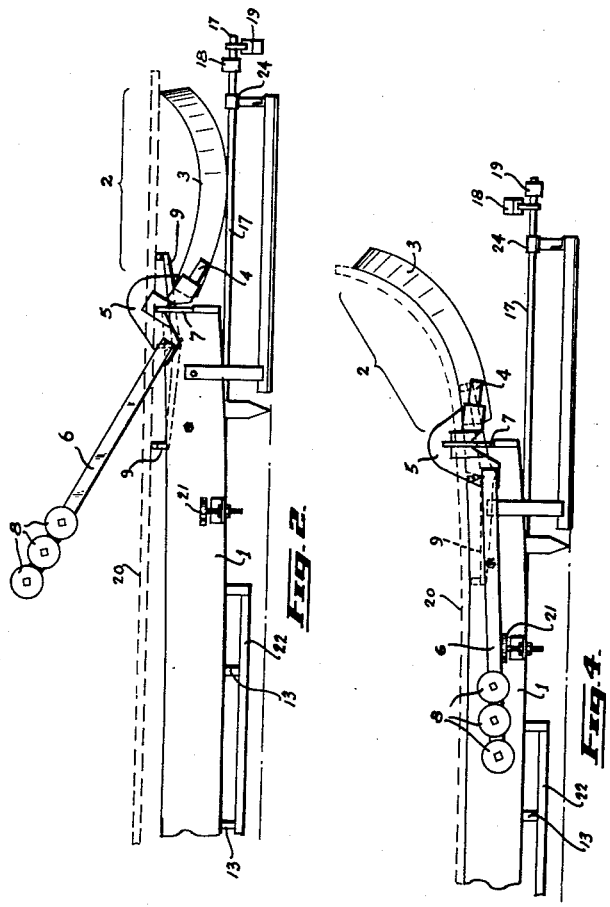
FIGURE 2 is a side view of the mould as seen from the bottom of FIGURE 1.

When the glass is heated the weights 8 secured to the free ends of the arms 6 have the effect of tending to rotate each end portion 2 upwardly and inwardly (anti-clockwise in the case of the end portion illustrated) to bring the glass from the flat position seen in FIGURE 2 to the concave position seen in FIGURE 4. In the fully rotated position the arms 6 come to rest each upon an adjustable stop 21 the position of which thus determines the limit of rotation of the associated end portion 2. The parts so far described were all known prior to the present invention.

Figure 3:
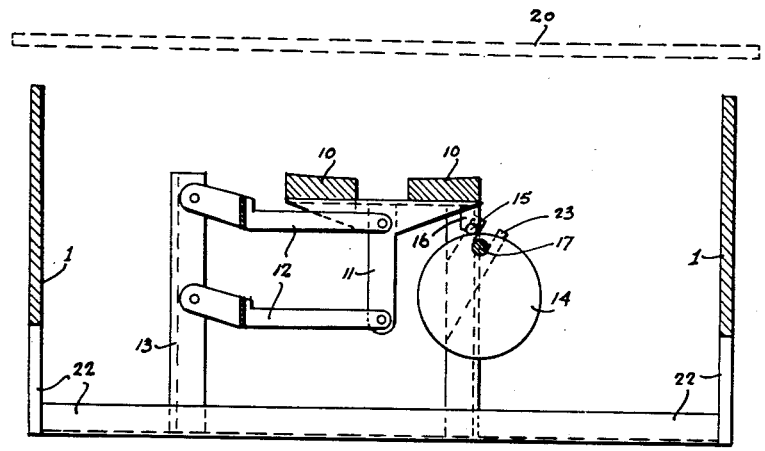
FIGURE 3 is a section on line III—III in FIGURE 1.
Figure 5:
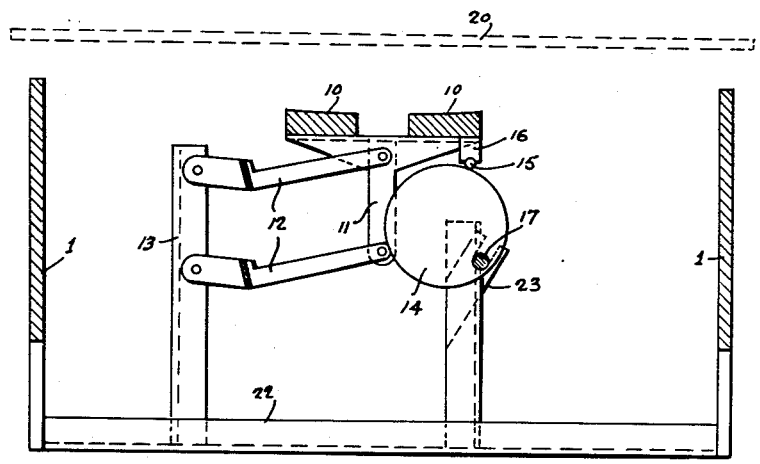
FIGURE 5 is a view similar to FIGURE 3 showing the parts in different positions.

The chilling device with which the present invention is concerned comprises a pair of mild steel bars 10 (see particularly FIGURES 1, 3 and 5) each about a half to three-quarters of an inch thick and positioned to extend parallel to each other along an area transversely centrally positioned with respect to the side bars 1 of the mould, and longitudinally centrally positioned with respect to the two movable end portions 2. The chilling bars 10 are mounted on mounting means comprising a pair of T-bars 11 each pivotally connected by links 12 to a fixed supporting member 13 extending upwardly from a lower framework 22 extending between the side bars 1 of the mould. The T-bars 11 may be moved up and down by means of control means comprising a cam 14 that cooperates with a cam follower 15 formed on the end of a projection 16 extending downwardly from the undersurface of the nearer bar 10. The cam 14 is secured to a shaft 17 which is mounted in bearings 23 and 24 and extends to one end of the mould (FIGURES 1, 2 and 4) where control arms 18 and 19 are connected to it. In FIGURES 1 and 3 the assembly of T-bars 11 and chilling bars 10 is shown in the lowered position with the control arm 18 horizontal and the control arm 19 projecting somewhat downwardly (see the full lines position of FIGURE 6 which is an enlarged end view of these arms alone). If the shaft 17 is rotated 135° clockwise as seen in FIGURES 3, 5 and 6, the chilling bars 10 are brought to the raised position (FIGURES 4 and 5), while the control arm 18 occupies the position indicated by broken lines in FIGURE 6 and the control arm 19 occupies the position previously occupied by the arm 18 (see the numeral 19 with the broken lead line).

This device may be operated in two different basic manners.

According to a first method of use illustrated in FIGURES 7 to 10, the chilling bars 10 will be brought to the raised position while the glass 20 is still lying flat and cold on the mould, i.e. prior to passage through the lehr or during the early stages of such passage. This condition is illustrated by FIGURE 7 with the glass 20 held high above the side bars 1 of the mould in the central area thereof. As the glass is heated it will sag first longitudinally to bring it to the position seen in FIGURE 8 and then transversely so that its central area will gradually move downwardly and approach the chilling bars 10 (FIGURE 9). The bars 10 will have a marked decelerating effect on the latter part of this movement even though the glass may never touch them. This is because they will be at an appreciably lower temperature than the glass as a result of their relatively high thermal capacity and will exert a significant cooling action on the glass before physical contact is established.

Depending on the degree of chilling required, the bars 10 may be lowered just before physical contact takes place, or shortly thereafter. FIGURE 10 shows this final step with the bars 10 in the lowered position.

It has always been believed that it is impractical to touch the centre of the glass surface with a metal object while the glass is hot without leaving a mark or otherwise marring the appearance or optical properties of the glass. For this reason contact between the mould and the glass has always been restricted in a skeleton mould to the periphery of the glass where marking is not seriously disadvantageous because it will be hidden in the final product by the frame, or at least will be displaced from the area in principal use for optical purposes.

It has now been discovered, surprisingly, that it is possible to touch the glass without forming blemish markings at its central area, provided the temperature of the metal coming into contact with the glass is low and the rate of contact approach is slow. Once physical contact is established, there will be an increased cooling or chilling effect due to the better heat conduction. There will also be direct physical restraint against further downward movement. It will be noted that the upper surfaces of the bars 10 are curved to complement the glass curvature.

If the bars 10 have been held in their upper position until establishment of physical contact, it will normally be preferred to lower them quite shortly thereafter, unless it is desired to form a definite depression in the undersurface of the glass. Such lowering of the chilling bars 10 will normally coincide with movement of the mould into the cooler annealing section of the lehr where the glass becomes sufficiently rigid to support its own weight in the position now assumed and does not receive sufficient further heat to resoften and sag further.

In accordance with a second method of employing the chiller bars 10, illustrated in FIGURES 11 to 13, the mould may start through the lehr with the chilling assembly lowered (FIGURE 11) so as to have little or no cooling effect on the glass 20 at this stage with no corresponding tendency to inhibit commencement of the sagging operation. This method thus has advantage in facilitating initiation of the sagging movement for which it will be remembered that it is often necessary to provide additional heaters above the glass. The chiller bars 10 will then be raised at an appropriate point along the lehr when the glass 20 will have sagged nearly to the position in which it will be in contact with the bars in their raised position. FIGURE 12 shows the conditions just prior to this moment, the glass having sagged both longitudinally and transversely; and FIGURE 13 shows conditions just after the bars 10 have been raised. The bars 10 will then exert a sudden chilling effect on the glass at this comparatively late stage in the operation, without having delayed the initial stages. As in the first method of operation chilling may take place by actual physical contact between the glass 20 and the bars 10, or merely by virtue of their close proximity. Also as in the first method, once the sagging movement has been arrested, the bars 10 will be relowered to the FIGURE 10 position and the mould moved to a cooler part of the lehr to set the glass.

Raising and lowering of the chilling assembly is accomplished by engagement of the respective control arms 19 and 18 with fixed stops projecting at selected points from the side of the lehr into the path of travel of one or other of such arms. Thus at the point where it is required to raise the assembly, i.e. prior to the whole bending operation in the first type of operation just described, or towards the end of the bending section of the lehr in the second method of operation, a fixed stop will engage the control arm 19 which will be travelling in the direction of the arrow T (FIGURES 1 and 6). As a result the shaft 17 will be rotated 135° clockwise to raise the chilling assembly and move the control arm 18 into its raised position (broken lines in FIGURE 6). When the time comes to lower the assembly, this will be effected by a second stop projecting at a somewhat higher level from the lehr wall into the path of travel of the arm 18 which will thus be returned to its original position.

It is to be understood that the chilling bars 10 may be replaced by a single bar or plate. A design employing a pair of spaced parallel bars has been chosen as a convenient method of providing a comparatively large periphery to the cooling device without employing too large or heavy a mass. As will be appreciated by those familiar with operations in this art, the actual amount of metal that will be required to provide the necessary but not an excessive degree of cooling will depend on many factors such as the mould dimensions, the nature of the glass, and the lehr conditions. The body of chilling metal will necessarily have a large thermal capacity in relation to the other adjacent mould parts, i.e. side bars and framework, but the exact extent of such capacity must remain a matter for calculation and experiment for each different application of the invention.

I claim:
1. In the art of forming a bend in a glass sheet by positioning said sheet on a skeleton type glass bending mould having glass supporting side bars extending longitudinally of the mold and then subjecting said sheet to an elevated temperature sufficient to produce sagging of a portion of said sheet intermediate said side bars below the neighbouring upper edges of said side bars, the step of checking bending of said portion of said sheet by moving into a position therebeneath and in physical contact therewith a body of metal of thermal capacity large in relation to adjacent mould parts.

2. A method of forming an elongated glass sheet with a transverse bend, comprising placing said sheet on a skeleton type glass bending mould having glass supporting side bars extending longitudinally of the mold, positioning a body of metal of thermal capacity large in relation to adjacent mould parts beneath and in proximity to a portion of said sheet intermediate said side bars, then subjecting said sheet to an elevated temperature sufficient to cause said portion to sag down into physical contact with said body, and finally withdrawing said body while permitting said sheet to cool.

3. In a skeleton type glass bending mould having a pair of side bars for supporting a sheet of glass generally horizontally; a body of metal of thermal capacity large in relation to adjacent mould parts, means mounting said body between said side bars spaced a substantial distance transversely from each of said bars, said means including means for moving said body between a raised and a lowered position, said raised position being a short distance below the level of a straight line joining the neighbouring upper edges of such bars, and said lowered position being a significantly greater distance below such level, and control means connected to said mounting means for moving said body to and from said raised and lowered positions.

4. The mould of claim 3, wherein said control means includes a shaft projecting beyond one end of the mould, means for raising and lowering said mounting means in accordance with the angular position of said shaft, and a pair of control arms secured to the projecting end of said shaft.

5. A concave, elongated, skeleton type, glass bending mould comprising a pair of generally parallel side bars, a framework supporting said side bars and movable end portions for initially supporting a cold sheet of glass horizontally and for bending such glass with a longitudinal curvature, said mould further including a chilling assembly mounted intermediate of said side bars and spaced a substantial distance transversely from each said bar and comprising a body of metal of thermal capacity large in relation to the side bars and framework of the mould, pivoted links connecting said body to said framework, a cam operative upon rotation to move said body between a raised position a short distance below the level of a straight line joining the neighbouring upper edges of said bars and a lowered position withdrawn a substantial distance below such level, a shaft connected to said cam, and means accessible from the exterior of the mould for rotating said shaft.

6. A method of forming an elongated glass sheet with a transverse bend, comprising placing said sheet on a skeleton type glass bending mould having glass supporting side bars extending longitudinally of the mold, positioning a body of metal of thermal capacity large in relation to adjacent mould parts beneath and in proximity to a portion of said sheet intermediate said side bars, then subjecting said sheet to an elevated temperature sufficient to cause said portion to sag down into physical contact with said body.

7. In a method of bending an elongated glass sheet into a shape comprising a longitudinal bend and a transverse bend comprising mounting a flat glass sheet above a skeleton shaping surface of a glass bending mould, said shaping surface comprising a pair of laterally spaced longitudinally extending side bars adapted to receive the glass sheet adjacent its longitudinal side edges after bending, and heating the glass sheet to its softening temperature to sag the sheet toward said side bars, the improvement comprising positioning a body of metal of thermal capacity large in relation to adjacent mould parts beneath a portion of said flat glass sheet and intermediate and spaced from said side bars while heating the glass sheet to its softening temperature and contacting said portion with said body after the glass sheet has started to sag toward said side bars and immediately before the glass sheet has sagged down to the extent necessary to provide the transverse bend.

8. In a method of bending an elongated glass sheet into a shape comprising a longitudinal bend and a transverse bend comprising mounting a flat glass sheet above a skeleton shaping surface of a glass bending mould, said shaping surface comprising a pair of laterally spaced, longitudinally extending side bars adapted to receive the glass sheet adjacent its longitudinal side edges after bending, and heating the glass sheet to its softening temperature to sag the sheet toward said side bars, the improvement comprising positioning a body of metal of thermal capacity large in relation to adjacent mould parts beneath and in proximity to a portion of said flat glass sheet and intermediate and spaced from said side bars, maintaining said body in such position while heating the glass sheet to its softening temperature and then contacting said portion with said body after the glass sheet has started to sag toward said side bars and immediately before the glass sheet has sagged down to the extent necessary to provide the transverse bend.

9. In a method of bending an elongated glass sheet into a shape comprising a longitudinal bend and a transverse bend comprising mounting a flat glass sheet above a skeleton shaping surface of a glass bending mould, said shaping surface comprising a pair of laterally spaced, longitudinally extending side bars adapted to receive the glass sheet adjacent its longitudinal side edges after bending, and heating the glass sheet to its softening temperature to sag the sheet toward said side bars, the improvement comprising positioning a body of metal of thermal capacity large in relation to adjacent mould parts beneath a portion of said flat glass sheet intermediate and spaced from said side bars, heating the glass sheet to its softening temperature and then moving said body towards and into contact with said portion of the glass sheet after the glass sheet has started to sag toward said side bars and immediately before the glass sheet has sagged down to the extent necessary to provide the transverse bend.

References Cited in the file of this patent

UNITED STATES PATENTS

| | | |
|---|---|---|
| 760,959 | Connington | May 24, 1904 |
| 1,999,558 | Black | Apr. 30, 1935 |
| 2,348,278 | Boyles et al. | May 9, 1944 |
| 2,452,448 | Paddock et al. | Oct. 26, 1948 |
| 2,570,309 | Black | Oct. 9, 1951 |
| 2,646,647 | Bamford et al. | July 28, 1953 |
| 2,761,248 | Crowley et al. | Sept. 4, 1956 |
| 2,897,632 | Fowler et al. | Aug. 4, 1959 |

FOREIGN PATENTS

| | | |
|---|---|---|
| 1,097,088 | France | June 29, 1955 |
| 1,123,688 | France | June 18, 1956 |
| 704,312 | Great Britain | Feb. 17, 1954 |
| 745,992 | Great Britain | Mar. 7, 1956 |